United States Patent [19]
Matthews et al.

[11] Patent Number: 5,974,256
[45] Date of Patent: Oct. 26, 1999

[54] METHOD FOR TRANSLATING GRAPHICAL USER INTERFACE (GUI) RESOURCE DATA INTO NATIVE JAVA CODE

[75] Inventors: Gareth Christopher Matthews, Cedar Park; Kelvin Roderick Lawrence, Round Rock, both of Tex.

[73] Assignee: International Business Machines Corporation, Armonk, N.Y.

[21] Appl. No.: 08/939,955

[22] Filed: Sep. 29, 1997

[51] Int. Cl.[6] .................................................. G06F 9/45
[52] U.S. Cl. .................. 395/705; 395/702; 395/706; 395/712
[58] Field of Search .................. 395/701, 702, 395/705, 706, 712; 707/102, 513

[56] References Cited

U.S. PATENT DOCUMENTS

| | | | |
|---|---|---|---|
| 5,659,751 | 8/1997 | Heninger | 395/685 |
| 5,732,257 | 3/1998 | Atkinson et al. | 707/4 |
| 5,781,739 | 7/1998 | Bach et al. | 395/200.57 |
| 5,784,553 | 7/1998 | Kolawa et al. | 395/183.14 |

OTHER PUBLICATIONS

Hsieh et al., "Java bytecode to ntive code translation: The caffeine prototype and preliminary results", IEEE, pp. 90–97, 1996.

Chimera, Richard., "Platform independent user interface builders: where are we headed?", UIST ACM, pp. 235–236 Nov. 1993.

Myers et al., "The garnet user interface development environment", CHI, ACM, pp. 457–458 Apr. 1994.

*Primary Examiner*—Tariq R. Hafiz
*Assistant Examiner*—Anil Khatri
*Attorney, Agent, or Firm*—Jeffrey S. LaBaw; David H. Judson

[57] ABSTRACT

A graphical user interface layout is defined by a resource definition file having a set of resource directives associated therewith. A method of translating the layout to native Java source code begins by identifying each resource file directive associated with the window layout. For each resource file directive, or for each subdirective within a file directive or subdirective, the method generates a stub or "snippet" of Java code. The Java code snippets may be generated by direct code or by using a text-editable file interface, and the snippets are then combined to created a Java source file.

30 Claims, 5 Drawing Sheets

```
/**********************************************************************
 * FileName : monres.rc
 *
 **********************************************************************/
define INCL_PMWIN include "monres.h"
include <os2.h>
ICON   ID_MON_MAINWND              "pmmon.ico"

BITMAP ID_BMP_MON_HOST             "host.bmp"
BITMAP ID_BMP_MON_HOST_REPLICATE   "hostrep.bmp"
BITMAP ID_BMP_MON_RMT_STOP         "monstop.bmp"
BITMAP ID_BMP_MON_RMT_GO           "mongo.bmp"
BITMAP ID_BMP_MON_RMT_TRAP         "montrap.bmp"
BITMAP ID_BMP_MON_LOGO             "icatmon.bmp"
BITMAP ID_BMP_MON_ABOUT            "icatmon2.bmp"
```

*Resource directive 38*

*34*

```
/**********************************************************************
 * Resource: Main Window Resource
 **********************************************************************/
MENU ID_MON_MAINWND
{
  SUBMENU "~File",            ID_MON_MFILE
  {
    MENUITEM "~Save Info",    ID_MON_MFSAVE,         MIS_TEXT
    MENUITEM "~Exit",         ID_MON_MFEXIT,         MIS_TEXT
  }
  SUBMENU "~Options",         ID_MON_MOPTIONS
  {
    MENUITEM "~Configure",    ID_MON_MOCONFIG,       MIS_TEXT
  }
  SUBMENU "~Help",            ID_MON_MHELP
  {
    MENUITEM "~General Help", ID_MON_MHGEN,          MIS_TEXT
    MENUITEM "~Index Help",   ID_MON_IDX,            MIS_TEXT
    MENUITEM SEPARATOR
    MENUITEM "~About",        ID_MON_ABOUT,          MIS_TEXT
  }
#ifdef MON_TEST
  SUBMENU "~Tester",          ID_MON_MTESTER
  {
    SUBMENU "~Local Session", ID_MON_MTEST_LOCAL
    {
      MENUITEM "~Create Remote Session(s)",
                   ID_MON_MTEST_HOST_CREATERMT, MIS_TEXT
```

*Subdirective for the resource directive MENU 40*

*36*

*Subdirectives for the resource subdirective SUBMENU 42*

```
fffffffffffffffffffffffffffi
= java_class.jvo File Below
= Note: Items that are surrounded by "$" e.g. $JCLASSNAME$ are filled in by the
translator during
= processing of the JVO file. Items surrounded by "@" are user defined macros
that flow through the
= the entire directive processing for each .jvo files to generate the complete
java source file.
fffffffffffffffffffffffffffi

[JAVA_CLASS]
./************************************************************************
./This is the Java Class Overlay file
./************************************************************************

/**************************************************************************
* Module Name : $JCLASSNAME$
* Owner       : $JOWNER$
* Date        : $CDATE$
* Time        : $CTIME$
*
* Additional Info : none
*
* Description :
*
*
* Private   ()
* Public    ()
* Protected ()
*
**************************************************************************/
import java.io.*;
import java.util.*;
import java.lang.*;
public class $JNAME$_Frame extends Frame
{
   private boolean inAnApplet = $JAPPLETGEN$;
   private String windowTitle = $JTITLE$;
   private String MyString = @mymacro="$JTITLE$"@;
```

TO FIG. 6B

FROM FIG. 6A

```
/******************************************************************************
 * Method      : <$JCLASSNAME>
 * Parms       : none
 * Description : Default Constructor
 ******************************************************************************/
$JNAME$_Frame()
{
   super(windowTitle);
};
/******************************************************************************
 * Method      : $JCLASSNAME$
 * Parms       : none
 * Description : Copy Constructor
 ******************************************************************************/
$JNAME$_Frame($JNAME$_Frame)
{
};
/******************************************************************************
 * Method      : handleEvent
 * Parms       : none
 * Description : Event handling method
 ******************************************************************************/
public boolean handleEvent(Event eventItem)
{
   if(eventItem.id = = Event.WINDOW_DESTROY)
   {
      if(inAnApplet)
      {
         disposel();
      }
      else
      {
         System.exit(0);
      }
   }
   return super.handleEvent(eventItem);
};
}
```

*FIG. 6B*

METHOD FOR TRANSLATING GRAPHICAL USER INTERFACE (GUI) RESOURCE DATA INTO NATIVE JAVA CODE

BACKGROUND OF THE INVENTION

1. Technical Field

The present invention relates generally to computer software development tools and more particularly to a method for translating resource-based windowing data into native Java source code.

2. Description of the Related Art

Java, originally developed by Sun Microsystems, is an object-oriented, multi-threaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser or applet viewer.

Many enterprises have large investments in computer programs that were originally written for event-driven windowing environments. Such programs are platform-dependent and use so-called "resource definition files" to define the layout of windows, menus, bitmaps, icons and other basic controls that comprise a graphical user interface ("GUI"). In such environments, when an application needs a resource, it makes a request to the operating system to load and display the resource element. Resource definition files thus define the graphical layout for window-based applications. Java, on the contrary, uses native methods in its runtime to construct and load graphical layouts for an application. There are no binary formats, for example, that describe how particular windows-based resources should be laid out or generated. Java does not use or support resource definition files.

Enterprises that now desire to migrate applications from their existing resource-based window environments (which are platform-dependent) to Java (which is platform-independent) face a significant problem. The problem occurs in trying to migrate existing code from an event driven windowing environment (which uses resource definition files) to the Java environment (which does not). Before an application can be migrated from a resource based windowing environment to Java, the window interface code for the application must be completely rewritten. This is a costly and complicated task.

The present invention provides a solution to this problem.

SUMMARY OF THE INVENTION

It is thus a primary object of this invention to translate GUI-based resource data structures to Java code.

It is another primary object of this invention to translate resource definition files to native Java source code to facilitate quick migration of existing applications from a resource-based environment to the Java programming environment.

Another important object of this invention is to enable fast migration of existing platform-specific window definitions to Java platform-independent code.

It is a by-product or advantage of this invention to reduce the time and effort necessary to port a platform dependent software application into a platform-independent programming environment such as Java.

It is still another more general object of this invention to decrease the development time and expense associated with creating a window interface for a given application, or the time and expense associated with porting an existing window interface for the application to a new programming environment.

The present invention translates graphical user interface information, e.g., a window-based resource file, to Java native code to facilitate migration to Java of existing native applications. Generally, the solution comprises processing the window-based resource file and translating it into native Java source code, using the directives defined by the resource format. After the directives are processed, the basic "skeletal" structure of the windowing layout is generated in native Java source code. Appropriate event management code may then be incorporated into the Java code to provide a Java-based version of the interface. With this backbone, the enterprise may port its existing application to Java in a prompt and efficient manner.

According to a more specific aspect of the present invention, a method of translating a window layout to native Java source code begins by identifying each resource file directive associated with the window layout. For each resource file directive, or for each subdirective within a file directive or subdirective, the method generates a stub or "snippet" of Java code. The Java snippet code may be generated by direct code or by using a text-editable file interface. The latter approach is advantageous because it enables a particular user (e.g., a user desiring to migrate an existing application) to use customized stub code. The method thus allows for user-customization of the translated Java code for each defined directive to enhance the flexibility of the migration process. The Java snippet codes generated by the translation of each resource directive (or subdirective, in an iterative process) are then collected to form the Java-based version of the window layout.

According to another aspect of the present invention, a translation tool is used to migrate resource-based windowing data to Java source code. Preferably, the translation tool is written in Java and is run under the Java programming environment. The translation tool includes a first program means for identifying each resource directive within a resource definition file. The first program means also identifies each resource subdirective within a given resource directive, as well as any further nested levels of directives within a particular subdirective. For each resource directive identified by the first program means, a second program means translates the particular directive into Java stub code. A third program means is responsive to translation of the resource directives by the second program means for generating a Java source code file defining the resource-based windowing data. The Java source file enables the user of an existing native application (that uses the resource-based windowing data) to be easily ported to the Java environment.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 4 is a portion of a representative resource definition file in a script format;

FIG. 6 is a representative Java class overlay file for use by the translator according to the preferred method of the present invention.

DETAILED DESCRIPTION OF THE PREFERRED EMBODIMENT

Figure 1:
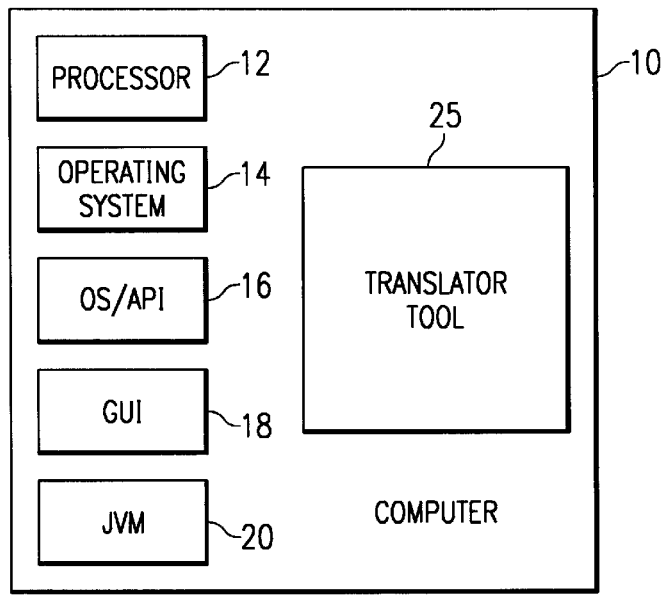
FIG. 1 is a block diagram of a representative computer in which the present invention is implemented in whole or in part.

As will be described below, one or more of the processes that comprise the "translator" of the present invention may be carried out on a computer, or on one or more computers connected via a computer network. Referring to FIG. 1, a computer for use in implementing the present invention is shown. The computer 10 has a processor 12, an operating system 14, an operating system application programming interface (API) 16, a graphical user interface 18, and a Java virtual machine (JVM) interpreter 20. The JVM is an abstract computing machine that includes an instruction set and uses various memory areas. Further details about the JVM may be obtained in *The Java™ Virtual Machine Specification,* Tim Lindholm and Frank Yellin, Addison Wesley (1997), ISBN 0-201-63452-X, which is incorporated herein by reference.

Thus, for example, the computer used in the present invention is any personal computer or workstation client or server platform that is Intel-, PowerPC®- or RISC®-based, and that includes an operating system such as IBM® OS/2®, Microsoft Windows 95, Microsoft Windows NT 4.0, Unix, AIX®, OS/400 or the like. A representative computer runs an Intel x86 processor, the OS/2 Warp Version 4.0 operating system, and JVM Version 1.0.2 or higher. Alternatively, the computer runs an x86 processor, the Windows 95 (or Windows NT) operating system, and JVM Version 1.0.2 or higher. Yet another alternative is to run a computer having a PowerPC or RISC-based processor, the AIX operating system, and JVM 1.0.2 or higher.

The translator tool 25 is preferably implemented in software and, more particularly, is written in Java for execution by the Java virtual machine interpreter 20. Although the translator tool 25 is preferably Java-based, this is not a requirement of the present invention. A Java-based translator, however, is portable across multiple development platforms. Translator tool 25 functions generally to translate a resource definition file to native Java source code. As is well-known in the art, a "resource definition file" defines the layout of windows, menus, bitmaps, icons and other basic controls that comprise a graphical user interface ("GUI") for use by a software application. As used herein, a "resource definition file" may define a specific resource, or a number of resources. The translator tool 25 is operable to migrate a windows-based resource definition file to the Java programming environment, where such file may then be enhanced (e.g., by incorporating event management functionality) and used to port an underlying application. Windows-based resource files that may be processed by the translator tool include known graphical user interfaces such as IBM OS/2 Presentation Manager, Microsoft NT, Microsoft Windows 95, Macintosh, and X Windows, as well as others.

Although not required, the various processes that comprise the present invention may reside on the same host machine or on different machines interconnected over a network (e.g., the Internet, an intranet, a wide area network (WAN) or local area network (LAN)). Thus, a machine running the present invention has appropriate networking hardware to establish a connection to another computer. For example, the machine may have a TCP/IP or NETBIOS connection to a network running over a token ring or Ethernet adapter.

Figure 2:
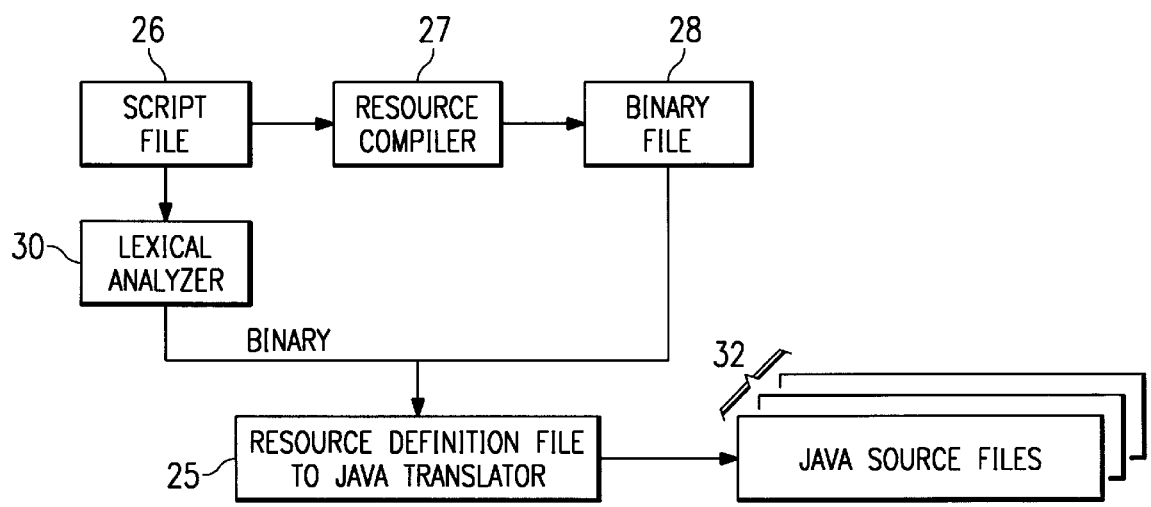
FIG. 2 is a block diagram illustrating the main processing function of the resource file translator tool of the present invention.

FIG. 2 is a block diagram of the basic operation of the translator tool of the present invention. The tool may receive the resource definition file in the form of a script file 26, or in the form of a binary file 28. The particular binary data structure for the resource definition file is typically defined in the toolkit manual or other reference source associated with the GUI. If a script file 26 is used, the file should be first processed by a lexical analyzer 30 to generate a binary data structure file for input to the tool 25. The lexical analyzer 30 must include appropriate processing capability to parse the scripting format and translate such formats into the binary data structure file. Alternatively, the script file 26 may simply be converted into the binary file through the use of a resource compiler 27. A resource compiler 27 is provided in many operating systems such as OS/2 or Windows 95. Thus, if a lexical analyzer is not available (or is not desirable), the binary file 28 may be created by running the script file through the resource compiler. As can be seen then, it is preferred that the translator tool receive a binary file corresponding to the resource definition file, although this is not a limitation of the invention. The translator then outputs java source files 32. These files comprise the window layout for the particular resource in question.

Figure 3:
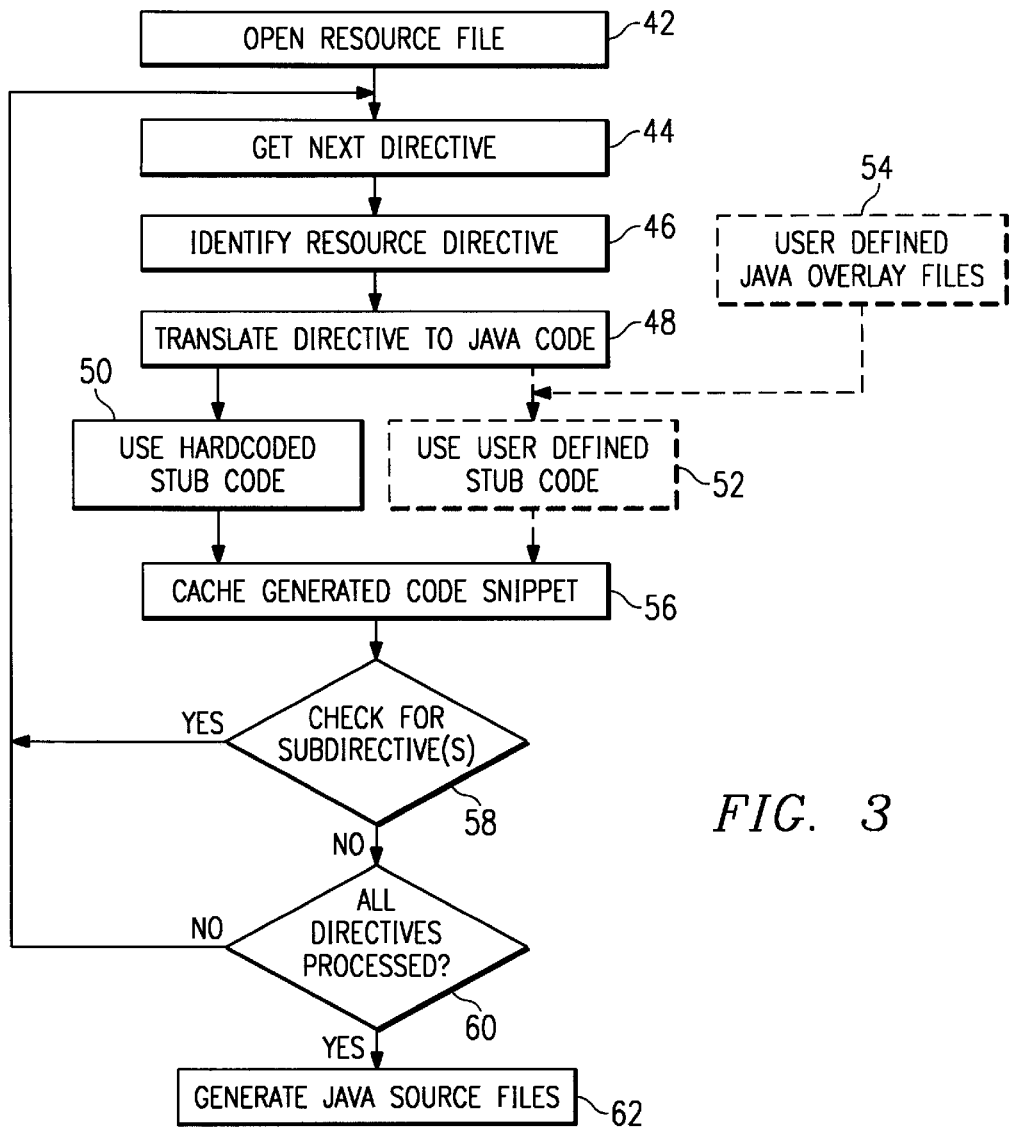
FIG. 3 is a flowchart illustrating the preferred method of operation of the translator tool of FIG. 2.

FIG. 3 is a flowchart illustrating a preferred operation of the translator tool. Before examining this flowchart in detail, it is desirable to examine a representative resource definition file. A portion of one such file is set forth in FIG. 4. This particular resource definition file 34 is associated with a remote systems monitor application. It includes a main window resource 36 that includes, at a top level, a MENU resource directive 38 titled ID_MON_MAINWND. The MENU resource directive resource 38 itself includes a number of SUBMENU subdirectives 40, including the SUBMENU subdirectives "~File", "~Options", "~Help" and so forth. The SUBMENU subdirective "~File" is titled ID_MON_MFILE and the "~Options" subdirective is titled IC_MON_MOPTIONS, and so on. As also illustrated, the "~File" SUBMENU resource subdirective itself includes a number of MENUITEM subdirectives (or sub-subdirectives) 42, including the "~Save Info" and "~Exit" items identified by the respective titles "ID_MON_MFSAVE" and "ID_MON_MFEXIT". Generalizing, it can be seen that the particular main window resource of this resource definition file includes at least one resource directive that itself may include one or more subdirectives, each of which may further include one or more sub-subdirectives, and so on. The resource directives in a particular resource definition file may therefore be considered hierarchical or recursive in that a particular resource directive (or subdirective thereof) may include further directives nested therein.

It should be appreciated that the resource definition file is not executable code or even a particular command structure. It is mere data, or simply a data structure, that describes a particular resource or resource element (in the case of FIG. 4, a main window resource). According to the present invention, the translator tool preferably translates each resource directive of the data structure into native Java source code. Each of the directives within the hierarchy is processed, preferably in an individual manner, to generate a Java source file associated with the directive. This process is now described generally with respect to the flowchart shown in FIG. 3.

The routine begins at step 42 by opening the resource definition file to be processed. At step 44, a next directive within the given resource definition file is obtained. In the first iteration, this directive is the first directive in the list (which corresponds to the MENU directive as discussed above with respect to FIG. 4). The routine then continues at step 46 to identify the resource directive. At step 48, the directive is translated to a Java code snippet in the form of either a hardcoded stub 50 or a user-defined stub 52. The user-defined stub format 52 is preferably created through application of a user-defined Java overlay file 54, as will be described below. At step 56, the Java code snippet is stored in appropriate cache or other storage.

A test is then performed at step 58 to determine whether the particular directive has any subdirectives. If the outcome of the test at step 58 is positive, the routine returns to step 44 to get the next directive (which, in this iteration, is a subdirective). If, however, the outcome of the test at step 58 is negative, a further test is made at step 60 to determine if all directives in the resource definition file have been processed. If the outcome of the test at step 60 is negative, the routine again returns to step 44 to get the next directive. If, however, the outcome of the test at step 60 is positive, the routine continues at step 62 to generate the Java source file.

Thus, according to the invention, the translator generates a Java snippet for the particular resource directive, subdirective, sub-subdirective, etc., as the case may be. Individual snippets are then structured together or otherwise assembled or combined into the Java source file (which may be a single file or multiple files). The Java snippets typically are not of fixed length, as one or more snippets build on each other to create the final source file. Therefore, according to the present invention, the individual Java snippets are collected into a "set" to create the native Java source code for the resource definition file or element, as the case may be.

As noted above, the particular resource directive may have many layers of nested subdirectives. Thus, one or more recursive processing loops may exist as needed to process the internally nested layers. Step 60 of the main processing loop is only positive when all of the resource directives within the hierarchy have been run through the stub generator to generate their associated Java snippet.

Figure 5:
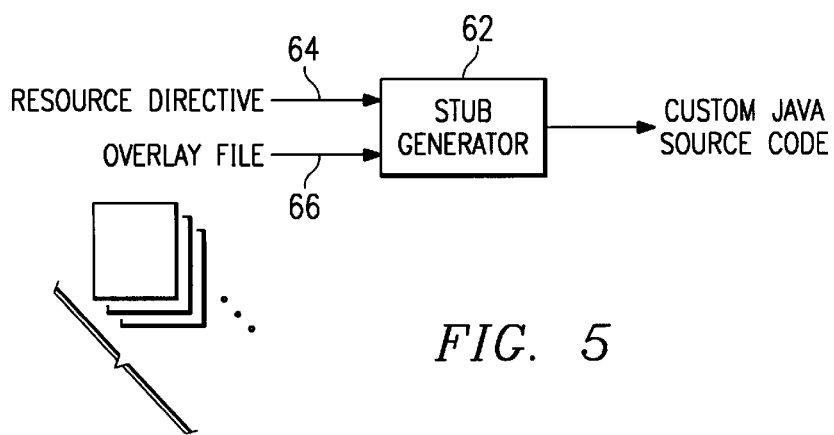
FIG. 5 is a block diagram of a preferred embodiment of the invention wherein a Java snippet is generated using a text-editable file.

According to the present invention, the stub generator may take the resource directive (or subdirective, sub-subdirective, etc., as the case may be) and generate the stub directly using a simple mapping of the directive to the Java code. This corresponds to the hardcoded stub code format 50 described above with respect to FIG. 3. A more preferred approach, using the overlay file to generate the user-defined stub code 52, is illustrated in the block diagram of FIG. 5. In this alternate approach, the Java stub generator 62 of the translator tool receives the resource directive (or subdirective, etc.) 64 as one input, as well as configuration or "overlay" file 66 as a second input. The overlay file is preferably a text-editable file that may be generated by a particular user. The stub generator parses the resource directive according to the text-editable overlay file to produce the Java source file output 68.

A representative overlay file is illustrated in FIG. 6. This overlay file (by way of example only) is used to facilitate translation of a particular "dialog" resource definition file (which defines the various aspects and characteristics of a window dialog function) into Java class files executable in a JVM. One or more elements of the dialog may be defined by either the translator or the user. Thus, for example, items identified by the "$" (e.g., $CLASSNAME$) are filled in by the translator during processing of the overlay file. Items surrounded by the "@" (e.g., MyString=@mymacro= "$JTITLE$"@) are user-defined macros that flow through the entire directive processing for each .jvo file to generate the complete Java source file. Thus, the overlay file facilitates a "macro-expansion" capability within a given file that allows a user to carry a particular variable across multiple overlays. In this manner, different users may create different output source files depending on their particular resource configuration. The use of overlay files facilitates user (and/or translator) customization of the translated Java code for each defined resource directive in order to enhance the flexibility of the migration process for multiple user requirements.

The following examples illustrate the translation of resource directive data structures (each in script form) to corresponding Java code according to the teachings of the present invention. In the first example, a resource directive describes a dialog template with a pushbutton that is translated into Java class code IDD_ABOUT( ). In a second example, a resource directive describes a pulldown menu that is translated into a Java menu bar component. In the third example, the resource directive is a data structure defining a set of text strings that are then converted into a vector of strings within a table. These examples, of course, are merely exemplary of the basic operation of the translator tool of the present invention:

Resource Directive Data (Example 1):

```
DLGTEMPLATE IDD_ABOUT LOADONCALL MOVEABLE DISCARDABLE
{
    DIALOG "About Information", IDD ABOUT, 75,69, 148,47, WS_VISIBLE,
        FCF_SYSMENU I FCF_TITLEBAR
    {
    PUSHBUTTON "OK", 1DB_OK, 37, 6, 74, 14
    LTEXT "This is Text Information", IDT_INFO, 23, 27, 112, 11
    }
}
```

```
Java Snippet Code:

class IDD_ABOUT extends Dialog
  {
    IDD_ABOUT()
    {
      super(new Frame() , "About Information");
      setLayout( null );
      setBounds (100, 100, 230, 120)
      /* * * * * * * * * * * * * * * * * * * * * * * * * * * *
      *   Add Controls to Dialog
      * * * * * * * * * * * * * * * * * * * * * * * * * * * */
      Label textInst = new Label("This is Text Information");
      textInst.setBounds (33, 40, 150, 11 );
      Button buttonInst = new Button("OK");
      buttonInst.setBounds( 60, 75, 110, 26 );
      add( textInst )
      add( buttonInst );
    }
  }
Resource Directive Data (Example 2):

MENU ID_MON_MAINWND
  {
    SUBMENU "~File", ID_MON_MFILE
    {
      MENUITEM "~Save Info", ID_MONMFSAVE, MIS_TEXT
      MENUITEM SEPARATOR
      MENUITEM "~Exit", ID_MON_MFEXIT, MIS_TEXT
    }
  }
Java Snippet Code:

{
    MenuBar menuBarInst = new MenuBar();
    Menu menuInst = new Menu("File");
    menuInst.add( new MenuItem("Save Info") );
    menuInst.addSeparator();
    menuInst.add( new MenuItem("Exit") );
    setMenuBar( menuBarInst );
  }
Resource Directive Data (Example 3)

STRINGTABLE
  {
    IDS_STRING1, "Test String 1"
    IDS_STRING2, "Test String 2"
    IDS_STRING3, "Test String 3"
    IDS_STRING4, "Test String 4"
    IDS_STRING5, "Test String 5"
  }
Java Snippet Code:

{
    Vector stringTable = new Vector();
    stringTable.add( new Label("Test String 1"));
    stringTable.add( new Label("Test String 2"));
    stringTable.add( new Label("Test String 3"));
    stringTable.add( new Label("Test String 4"));
    stringTable.add( new Label("Test String 5"));
  }
```

Although not shown in detail, it should be appreciated that the "binary format" of each resource definition file script is a simple binary representation of the information set forth in the script file. The actual binary format is documented in the particular operating system (OS) application programming interface (API) toolkit for the respective window layout.

Once the resource data is translated into Java native code that makes up the windowing framework, the event management and processing code must be added or merged into the Java framework to produce a working application. The event management code listens for an action by the user, e.g., a button push, menu item, list box, and responds with the appropriate processing code. The processing code is where the work is done (worker code) and is generally unique for each event. Below is an example of a menu event and processing code for Java 1.02; those skilled in the art would understand that Java 1.1 and higher event delegation modules could be used. Further, native event management and processing code could be integrated into the Java framework, e.g. C or C++, if the Java to native interface was utilized.

```
class MyClass
{
/***********************************************************
 * Method      : action
 * Description : Event action handler
```

-continued

```
*************************************************/
public boolean action( Event evtItem, Object objInst )
{
    String menItem = (String)objInst;
    /******************************************
     * Check mouse button selection
     ******************************************/
    if( evtItem.target instanceof MenuItem )    // <- Event Listening Code
    {
        if( menItem.equals( "Save"))             // <- Event Listening Code
        {
            saveFile();                           // <- Processing Code
        }
    }
}
/*************************************************
 * Method      : action
 * Description : Processing (worker) code
 *************************************************/
void saveFile()
{
    FileOutputStream   fileInst = new FileOutputStream("Filename");
    String             testString = new String("This is a test String");
    fileInst.write( teststring.getBytes() )
}
}
```

Thus, the invention encompasses the event management or processing code merged into or added into the translated Java code framework as set forth in the description above.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The present invention provides significant advantages over the prior art. The translation tool migrates or maps graphical user interface (GUI) information, e.g., a window-based resource file, to Java native code to facilitate migration to Java of existing native applications. As has been illustrated by this Preferred Embodiment, the inventive method comprises processing the Java source code, using the directives defined by the resource format. After the directives are processed, preferably in a recursive or iterative manner, the basic "skeletal" structure of the windowing layout exists as a set of native Java class files or source code. This code may then be used to port the native-based windowing layout to Java. In particular, appropriate event management code may be incorporated into the Java code to provide a Java-based version of the interface. With this backbone, an existing application may then be readily ported to Java code in a prompt and efficient manner.

Thus, after the skeletal structure of the windowing layout has been created according to the present invention, the basic "look and feel" of the GUI exists in Java. A set of "work" code must still be incorporated in order to provide the working interface. Nevertheless, the Java source files created by the invention significantly decrease the development time necessary for this overall porting task as these files represent (in Java) the "look and feel" of the actual final interface.

Java, as noted above, does not support binary formats to describe how a windows-based resource is to be laid out or generated. The present invention enables translation of existing windows-based resource binaries into Java native codes. If the resource definition file is script-based, it is preferably first converted into a binary format. The translator tool is then run against the resource binaries to generate a .java file. The use of a text-editor in conjunction with the translator enables the user to generate a customized version of the particular window resource or component. This enables the user to adapt a particular GUI to the user's desired look and feel. According to the invention, one or more resources (e.g., a window, font, control, etc.) in the windowing environment or otherwise constituting the GUI are preferably mapped to the appropriate Java native code and these codes are then collected to form the equivalent Java-based interface.

Although the present invention preferably translates windows-based resource elements into Java native code, one of ordinary skill in the art will appreciate that the inventive concepts may be applied more generally. Thus, the invention should also be construed to cover translating a resource definition file associated with a platform-dependent windowing environment to any object-oriented, platform-independent programming environment.

It should be appreciated by those skilled in the art that the specific embodiments disclosed above may be readily utilized as a basis for modifying or designing other techniques for carrying out the same purposes of the present invention. It should also be realized by those skilled in the art that such equivalent constructions do not depart from the spirit and scope of the invention as set forth in the appended claims.

Having thus described our invention, what we claim as new and desire to secure by Letters Patent is set forth in the following claims.

What is claimed is:

1. A method of translating a graphical user interface layout to native Java source code, the graphical user interface layout comprising at least one resource defined by a resource definition file including one or more resource directives, comprising the steps of:

(a) converting at least one resource directive into a given format;

(b) for each given format representing a resource directive, translating the given format into Java stub code; and (c) collecting the Java stub codes into a set.

2. The method as described in claim 1 wherein step (a) includes translating a resource directive script file into the given format.

3. The method as described in claim 1 wherein step (b) includes configuring the Java stub code according to a user-defined configuration.

4. The method as described in claim 3 wherein the user-defined configuration is defined in an overlay file.

5. The method as described in claim 1 wherein the resource directive includes at least one subdirective and step (b) also translates a given format associated with the subdirective to Java stub code.

6. The method as described in claim 1 wherein the given format is a binary format.

7. The method as described in claim 1 wherein the resource is a window layout resource selected from the group of window layout resources consisting of: windows, menus, bitmaps, icons and dialogs.

8. The method as described in claim 1 wherein step (a) converts each resource directive into the given format.

9. The method as described in claim 1 wherein the step of collecting the Java stub codes compiles the codes into an integrated Java source file.

10. A method of translating a graphical user interface windowing layout to Java source code, comprising the steps of:

(a) identifying each resource directive associated with the windowing layout;

(b) for each resource directive identified, identifying any resource subdirective(s) associated with the resource directive; and (c) generating Java stub code for each resource directive and any subdirective(s) identified in steps (a)–(b).

11. The method as described in claim 10 further including the step of converting the resource directive and any subdirective(s) identified in steps (a)–(b) to a binary format prior to step (c).

12. The method as described in claim 11 wherein the step of converting to the binary format includes translating a given directive from a script format to the binary format using a resource compiler.

13. The method as described in claim 10 wherein step (c) includes configuring the Java stub code according to a user-defined configuration.

14. The method as described in claim 13 wherein the user-defined configuration is defined in an overlay file.

15. The method as described in claim 10 further including collecting the Java stub codes into a Java class file.

16. A computer program product in computer-readable media for use in migrating resource-based windowing data to Java source code, the computer program product executable in a computer having a Java virtual machine (JVM), comprising:

means for identifying a set of resource directives within a resource definition file; and means, responsive to identification of the set of resource directives in the resource definition file, for translating at least one resource directives into Java stub code.

17. The computer program product as described in claim 16 wherein the identifying means also identifies any resource subdirective within a resource directive.

18. The computer program product as described in claim 16 wherein the translating means includes means for configuring the Java stub code according to a user-defined configuration.

19. The computer program product as described in claim 18 wherein the user-defined configuration is defined in an overlay file.

20. A method of translating a graphical user interface (GUI) windowing layout associated with a platform-dependent programming environment into source code native to an object-oriented, platform-independent programming environment, comprising the steps of:

identifying at least one resource data directive associated with the windowing layout; and translating the resource data directive into source code native to the object-oriented, platform-independent programming environment.

21. The method as described in claim 20 wherein the object-oriented, platform-independent programming environment is Java.

22. The method as described in claim 20 further including the step of converting the resource data directive into a binary format prior to the translating step.

23. The method as described in claim 22 wherein the resource data directive is converted into the binary format from a script file.

24. The method as described in claim 20 wherein the step of translating the resource data directive includes configuring the source code according to a user-defined configuration.

25. The method as described in claim 24 wherein the user-defined configuration is defined in an overlay file.

26. A Java class file defining a graphical user interface windowing layout resource and useful in porting to Java a software application associated with the graphical user interface, wherein the Java class file is generated by a method comprising the steps of:

(a) identifying each resource directive associated with the windowing layout resource;

(b) for each resource directive identified, identifying any resource subdirective(s) associated with the resource directive;

(c) generating a Java code snippet for each resource directive and any subdirective(s) identified in steps (a)–(b); and (d) collecting the Java code snippets generated in step (c) into the Java class file.

27. A computer, comprising:

a processor;

an operating system;

a Java interpreter; and a translator tool for use in migrating resource-based windowing data to Java source code, comprising:

means for identifying a set of resource data directives within a resource definition file; and means, responsive to identification of the set of resource data directives in the resource definition file, for translating the resource data directives into a Java class file.

28. A method of porting a software application originally written in an event-driven windowing environment into source code native to an object-oriented, platform-independent programming environment, wherein the software application is platform-dependent and has associated therewith a resource definition file including one or more resource directives that define a windowing layout, comprising the steps of:

translating each resource data directive into source code native to the object-oriented, platform-independent programming environment to generate a version of the windowing layout for use in the platform-independent programming environment; and using the version of the windowing layout to port the software application to the object-oriented, platform-independent programming environment.

29. The method as described in claim 28 wherein the object-oriented, platform-independent programming environment is Java.

30. An application having a Java-based graphical user interface (GUI) generated by a method comprising the steps of:

(a) generating a Java class file defining at least one resource of a windowing layout by:

(i) identifying each resource directive associated with the windowing layout resource;

(ii) for each resource directive identified, identifying any resource subdirective(s) associated with the resource directive;
(iii) generating a Java code snippet for each resource directive and any subdirective(s) identified in steps (i)–(ii); and
(iv) collecting the Java code snippets generated in step (iii) into the Java class file;

(b) augmenting the Java class file with event management code; and
(c) attaching the event management code to action processing code that performs one or more actions underneath the windowing layout.

* * * * *